May 29, 1934. W. W. RIEDEL 1,960,956
METHOD PRODUCING BALL AND SOCKET JOINTS
Filed June 26, 1931
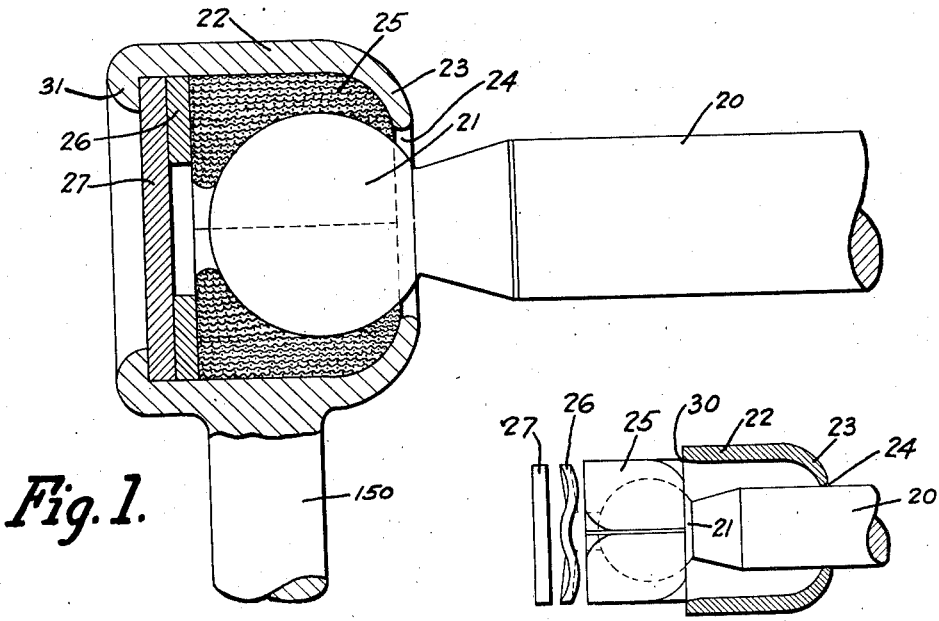
Fig. 1.
Fig. 2.
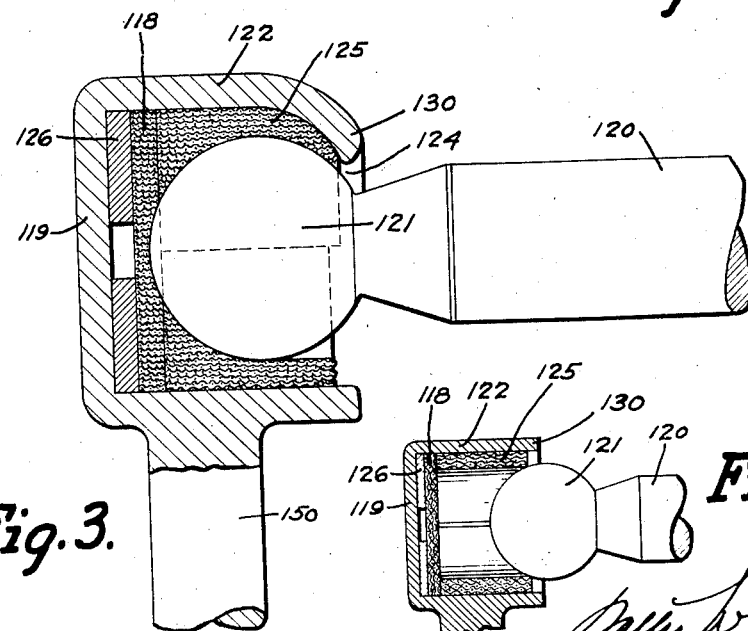
Fig. 3.
Fig. 4.
Inventor
Walter W. Riedel
By Stevens, Hardman and Fehr
Attorneys Patented May 29, 1934

1,960,956

UNITED STATES PATENT OFFICE 1,960,956

METHOD OF PRODUCING BALL AND SOCKET JOINTS

Walter W. Riedel, Dayton, Ohio, assignor, by mesne assignments, to General Motors Corporation, Detroit, Mich., a corporation of Delaware Application June 26, 1931, Serial No. 546,973

5 Claims. (Cl. 29—149.5)

This invention relates to an improved ball and socket joint and the method of producing it, and particularly to a ball and socket joint adapted to be used in the connecting link for shock absorbers on motor vehicles.

It is among the objects of the present invention to provide a self-lubricating ball and socket joint of simple and sturdy structure, and being adapted automatically to compensate for wear.

Another object of the present invention is to provide a method of producing a ball and socket joint which requires a minimum expenditure of time and labor.

Further objects and advantages of the present invention will be apparent from the following description, reference being had to the accompanying drawing wherein a preferred embodiment of one form of the present invention is clearly shown.

In the drawing:

Fig. 1 is a transverse sectional view of the ball and socket joint.

Fig. 2 is a view showing the relative positions of the various parts of the joint preparatory to assembling.

Fig. 3 is a view similar to Fig. 1, showing a modified form of construction.

Fig. 4 is a view similar to Fig. 2, on a reduced scale, however, showing the parts of the device preparatory for assembling.

Referring to the drawing, the joint comprises a shaft 20 having a ball end 21. The socket 22 is a tubular member having an inwardly extending flange 23 at its one end, the opening 24, defined by said flange, being of lesser diameter than the diameter of the ball end 21. 25 designates the lubricant containing fabric bearing of the ball and socket joint, which may be of any suitable wear-resisting material such as woven strands of asbestos or compressed wire gauze. A ring-shaped spring washer is designated by the numeral 26, while the end cover cap is designated by the numeral 27.

In assembling the ball and socket joint shown in Figs. 1 and 2, the bearing material 25 may be placed around the ball end 21 as shown in Fig. 2, then the shaft 20 is inserted into the socket 22 so that the body portion thereof extends through the opening 24 defined by the flange 23, the ball and its surrounding bearing material lying at the mouth 30 of the socket 22 as shown in Fig. 2.

The bearing material 25 may be wrapped in layers about the ball end 21 of the shaft or said bearing material may be preformed in sections each section having a spherical inside contour to fit the ball end 21, and a cylindrical outside contour to fit the socket 22, the outside diameter of the bearing material in either case, however, being slightly greater than the inside diameter of the socket. The ball end and its surrounding bearing material may be pressed into the socket and then the spring washer placed against the edge of the bearing material with the cover cap on the spring washer or if desired the spring washer 26 may first be placed against the outer edge of the bearing material 25 and then the cover cap 27 is placed upon the spring washer, after which the pressure is exerted upon the cover cap or disc 27, to force the ball 21 and its bearing material into the socket 22 until the inner end of the bearing material 25 engages with the inner surface of the annular flange 23 of socket 22. In either instance the bearing material is pressed into the socket, to urge it into intimate contact with the ball end 21 of the shaft 20. The spring washer 26 is compressed against the outer edge of the bearing material 25 to provide a pressure element within the joint which automatically compensates for wear.

While maintaining pressure against the cover disc or plate 27, the peripheral edge of the socket 22 designated by the numeral 31, is swaged over as shown in Fig. 1 to engage the cover disc or plate 27 and thus maintain it in spring compressing position. In this structure the spring is constantly exerting a pressure upon the bearing material 25, this pressure being of considerable degree so that the bearing material is urged into intimate engagement with the ball end 21 of the shaft and thereby maintains the joint substantially tight. The self-contained lubricant in the bearing material reduces the wear to a minimum and entirely eliminates the necessity of oiling by the operator of the vehicle.

Figs. 3 and 4 show a modified form of ball and socket joint, assembled in a different manner from that shown in the Figs. 1 and 2. In these figures the cylindrical socket 122 is in the form of a cup having an end wall 119. The shaft 120 has a ball end 121. A spring washer 126 is first placed within the socket 122 against the end wall 119 thereof; then a disc 118, of lubricant containing fabric material such as wire gauze or the like, is placed upon the spring washer, after which the bearing material 125, which may also be of woven wire gauze impregnated with a lubricant, is placed within the socket 122 providing a sleeve-like lining therein. This bearing material 125 may be layers of fabric wound into a sleeve like structure or it may be of pre-formed semi-tubular sections. The inside diameter of this bearing sleeve or lining is of lesser diameter than the ball 121 so that when the ball is pushed into the lining containing socket 122, parts of the bearing material are displaced to form a fillet within the socket providing a contour inside the socket which substantially follows the outline of a ball 121. The pressure of the ball 121 inwardly presses the rounded end of the shaft into the bearing disc 118 as shown in the Fig. 3, slightly denting it to form a seat and thus the spring washer 126 is compressed. Holding the parts in this compressed position, the peripheral edge 130 of the socket with its lining is swaged over and against the ball member 121, the edge of the socket defining an opening 124 which is of lesser diameter than the ball 121 and thereby prevents the removal of said ball from the socket. Swaging the peripheral edge of the socket toward the ball presses the bearing material 125 into gripping engagement with the ball 121 and at the same time maintains the spring washer 126 compressed so that it constantly exerts a pressure upon the bearing disc 118 which, as shown in Fig. 3, engages the inner edge of the bearing sections or sleeves 125, thereby constantly urging these bearing portions into intimate engagement with the ball 121 to maintain the ball and socket joint tight.

In both structures a rod 150 is secured to the socket member in any suitable manner, preferably by welding. For shock absorber purposes these rods are welded to the cylindrical surface of the sockets and extend therefrom at substantially right angles to the axis of said shafts.

In the present invention applicant has provided a sturdy and simplified construction in shock absorber ball and socket joint, capable of being produced at a minimum expenditure of time and labor and which have inherent resilient elements maintaining said ball and socket joints substantially tight over a comparatively long period of use. Personal attention to the ball and socket joints of the present invention is practically eliminated by the use of a lubricant containing bearing material. If compressed wire gauze is used, there is provided a metallic bearing shaped to conform with the contour of the ball and socket through pressing operations only, thereby substantially eliminating machining of the bearings to obtain good bearing surface contact.

While the form of embodiment of the present invention as herein disclosed, constitutes a preferred form, it is to be understood that other forms might be adopted, all coming within the scope of the claims which follow.

What is claimed is as follows:

1. The method of assembling a ball and socket joint which comprises, placing a sleeve of fibrous lubricant impregnated bearing material around the ball, then pressing the ball and the said sleeve into the socket so that said bearing material conforms to the contour of the ball and its socket, then pressing a spring washer into the socket against the edge of the bearing material and while maintaining pressure upon said spring, swaging the edge of the socket member inwardly to retain the spring compressed against the bearing material.

2. The method of assembling a ball and socket joint which comprises, placing a sleeve of fibrous lubricant impregnated bearing material around the ball, then pressing the ball and the said sleeve into the socket so that said bearing material conforms to the contour of the ball and its socket, placing a spring washer in the socket against the edge of the bearing material, inserting a cover plate into the socket and exerting pressure thereon to compress the spring washer against the edge of the bearing material, then swaging the edge of the socket over the cover plate to retain it pressing against the washer.

3. The method of producing a ball and socket joint comprising, preforming bearing blocks of fibrous lubricant containing bearing material so that they have a spherical inside conformation and a cylindrical outside shape; placing said blocks about the ball member of the joint, placing a spring washer against the outer edge of the bearing blocks; placing a disc upon the spring washer, then pressing upon the disc to force the ball and its surrounding bearing blocks into the socket member and compressing the spring washer against the blocks, then swaging the peripheral edge of the socket member over the disc to retain the parts in pressed assembled relation.

4. The method of producing a ball and socket joint comprising, providing a cylindrical socket member with an inwardly extending flange at its one end, providing a shaft with a ball end; placing a covering of lubricant containing fibrous bearing material about the ball end of the shaft; pressing said ball end and its covering into the socket so that the bearing material engages with the flange thereon; placing a ring-shaped spring-washer in the socket, inserting a cover plate in the socket and pressing it against the spring washer to compress it against the edge of the bearing and while maintaining said pressure, swaging the peripheral edge of the socket against the cover-plate.

5. The method of producing a ball and socket joint which comprises, pressing a lubricant containing fabric into the socket member and around the ball member contained therein, placing a ring-shaped spring washer in the socket and a disc upon said spring washer, then pressing the disc against the spring washer to compress it against the edge of the fabric surrounding the ball, then while maintaining said pressure upon the disc, securing it within the socket to maintain its pressure upon the spring washer.

WALTER W. RIEDEL.